Jan. 5, 1932.  E. G. HIBBS ET AL  1,839,313
STALL CONSTRUCTION
Filed Aug. 13, 1929

Inventors
E. G. Hibbs
D. D. Miller
By William H Miller
Attorney

Patented Jan. 5, 1932

1,839,313

UNITED STATES PATENT OFFICE

EDWIN G. HIBBS AND D. D. MILLER, OF CANTON, OHIO, ASSIGNORS TO THE NEY MANUFACTURING COMPANY, OF CANTON, OHIO, A CORPORATION OF OHIO

STALL CONSTRUCTION

Application filed August 13, 1929. Serial No. 385,591.

Our invention relates to improvements in stalls adapted for use in dairy barns. Stalls for this purpose have usually been of three different types; the box stall or pen, in which the animal is confined, yet is free to move about; the stanchion stall, in which the animal's neck is held between stanchion bars which arrest and greatly limit its movements; and the tie stall in which the animal is tied by halter or neck strap, permitting greater freedom of movement than the stanchion stall and providing much of the comfort of the box stall. Of these three types of stall, the stanchion stall has been most popular with dairychion stall has been most popular with dairymen because with it the animal is so restrained that the gutter at the rear of the stall serves its proper purpose and the stall floor and bedding are thus kept clean and sanitary in a way that has not heretofore been possible with tie stalls. Both comfort of the animal and cleanliness being essential in dairy barns, it will be seen that means for naturally controlling, rather than forcibly restraining the movements of the animal is very desirable. The objects of our invention are to improve the construction of tie stalls in such way as to govern the animal's movements within the stall in a natural way to accomplish the cleanliness ordinarily attained by the use of stanchions. Further objects are to provide a particularly sanitary and substantial construction and to provide certain adjustable features to render the stall readily adaptable to animals of various sizes, the construction being simple and relatively inexpensive. At the same time, we have so arranged our construction that the various parts of the stall cooperate to serve various purposes in the complete management and care of dairy cows, in a way that will hereinafter more fully appear.

These objects, together with other objects which will be apparent to those skilled in the art, may be attained by the construction illustrated in the accompanying drawings, although our invention may be embodied in other forms, the construction illustrated being chosen by way of example.

Figure 1:
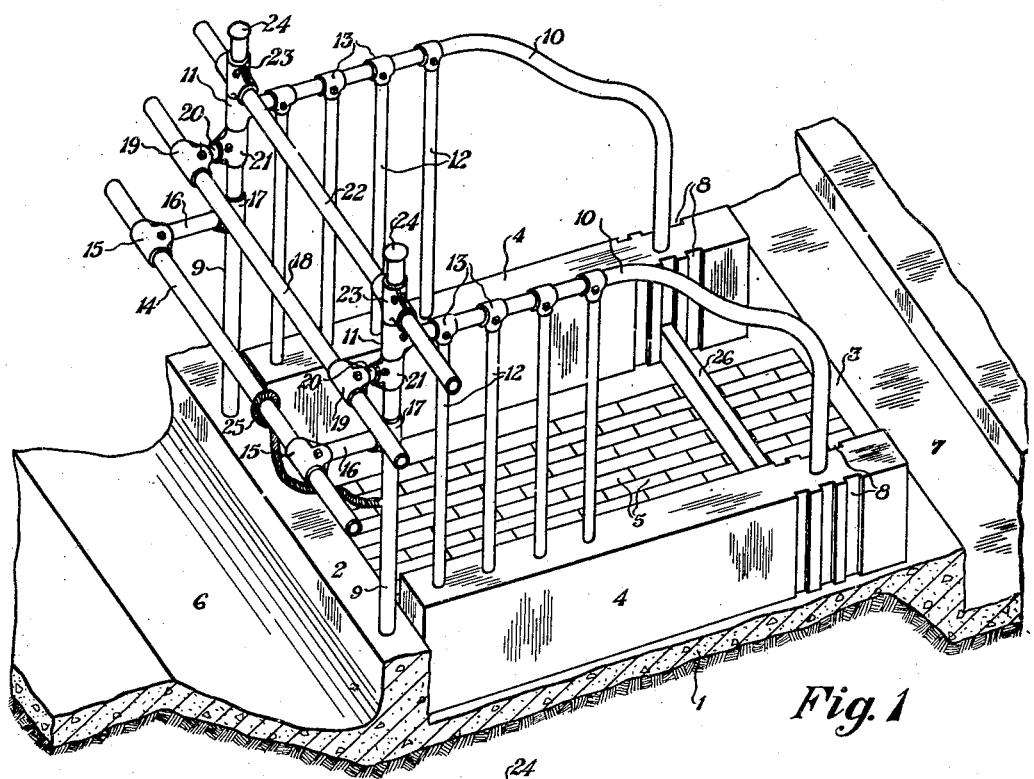
Figure 3:
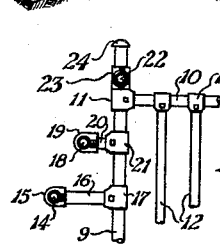
Figure 4:
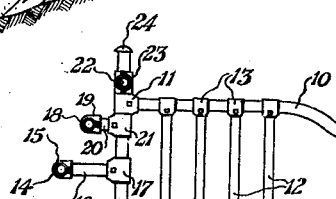
Figure 4:
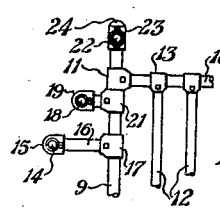
Figure 2:
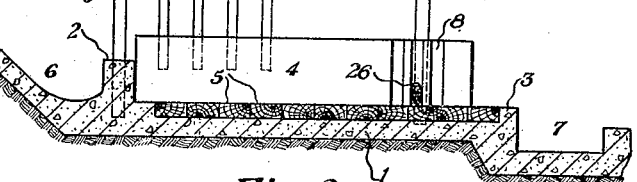
Figure 5:
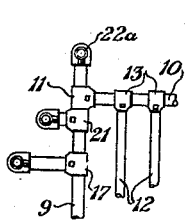
Figure 6:
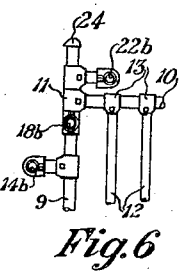
Figure 7:
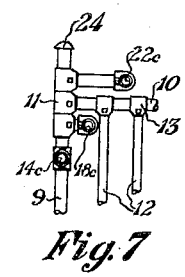

In the accompanying drawings Figure 1 is a front perspective view of a cattle stall embodying our invention. Figure 2 is a vertical, longitudinal sectional view of the same. Figures 3 and 4 are fragmentary views showing the front of the same stall with the barrier members or parts in different adjustments. Figures 5, 6 and 7 are similar views of three variations of the same invention.

Throughout the several views similar reference numerals indicate similar parts.

More specifically describing the construction disclosed in the said drawings, the numeral 1 indicates the concrete stall bottom, which is formed integrally with the manger curb 2 at the front end of the stall, the floor retaining flange 3 at the rear of the stall and the side curbs 4. The floor of the stall may be made of concrete or other suitable material, such as the wood blocks 5 which are supported upon the stall bottom and the manger 6 and gutter 7 at the front and rear of the stall, respectively, may be of usual construction and are preferably formed integrally with the other concrete parts. It will be noted that the manger crub 2 is preferably lower than the side curbs 4 and that the side curbs 4 on their sides near the rear ends are provided with a series of vertical grooves 8 for the purpose hereinafter disclosed.

The stall superstructure is preferably formed of metal tubing. The stall posts 9 are firmly set in the manger curb 2 so as to be strong and substantial and to each stall post is connected the forward end of the stall partition 10, the rear end of which extends downward and is firmly anchored in the side curb 4 in the usual way. The connection of the stall partition to the stall post may be made in any suitable manner, preferably by a clamp 11 of well known construction. At the forward portion of the partition 10 a series of vertically disposed fillers 12 are connected at their upper ends to the said partition as by the clamps 13, of well known construction, and have their lower ends imbedded in the side curb 4.

Extending across the front of the stall, and forming the only barrier at the front end thereof is a plurality of horizontally disposed, vertically spaced tubular members arranged in an upwardly inclined series from front to rear. In the stall illustrated in Figures 1 to 4 this series comprises a lower member 14 connected by the clamps 15 to the front ends of the horizontally disposed, forward-projecting arms 16, which are preferably formed of tubular metal and have their rear ends connected to the stall posts 9, as by the clamps 17, which are of usual construction and are vertically adjustable on and fixedly attachable to the posts 9. Above and to the rear of the lower member 14 and parallel with it is the tubular middle member 18, which is connected by means of clamps 19, similar to the clamps 15, to the arms 20, which are similar to but shorter than the arms 16, said arms 20 being vertically adjustable on and fixedly attachable to the posts 9 by means of the clamps 21, which are similar to the clamps 17. Above the middle member 18 and parallel with but to the rear of the said middle member is the tubular upper member 22, which in that form of the invention illustrated in Figures 1 to 4 is set between the posts 9 and is vertically adjustable on and fixedly attachable to said posts by means of the clamps 23 of well known construction. In order to provide the top ends of the posts 9 with an appropriate finish the cap buttons 24, of any well known construction but preferably having a spherical top surface may be provided.

It will be noted that the posts 9 extend above the clamps 11 a sufficient distance to permit the clamps 23 to be vetrically adjusted on the posts 9, so that said clamps 23 may rest directly upon the clamps 11, as in Figures 1, 2 and 3, or may be arranged at a higher point on the posts 9, as illustrated in Figure 4. In similar manner the clamps 21 may be located immediately under the clamps 11, as in Figures 1, 2 and 4, or may be moved downward on the posts 9 to any desired lower position, as for instance that illustrated in Figure 3. In similar manner the clamps 17 may be vertically adjusted on the posts 9, Figure 3 showing the same in lower adjustment than Figures 1, 2 and 4.

In the variation of construction illustrated in Figure 5, it will be noted that the clamp connecting the upper member 22a to the post 9 is of similar construction to that of the clamps 15 and 19, the cap button 24 being omitted and the member 22a being thus placed directly above instead of between the posts 9. In this form of construction the said upper member as well as the middle and lower members may be formed continuously for a series of stalls, whereas in the construction illustrated in Figures 1 to 4 the upper members 22 of a series of stalls are not continuous.

In the construction illustrated in Figure 6 the upper member 22b is located to the rear of the post 9 and is vertically adjustably connected by two clamps and an arm, similar to the clamps 19 and 21 and arm 20, except that the same extend rearwardly. In this construction the middle member 18b is not continuous but is set in between the posts 9 and is vertically adjustably connected thereto by clamps similar to the clamps 23 in Figures 1 to 3, while the lower member 14b is vertically adjustably connected to the posts 9 by means of clamps and an arm similar to the clamps 19 and 21 and arm 20 of Figures 1 to 3.

In the construction illustrated in Figure 7 the lower member 14c is not continuous but is set in between the posts 9 and is vertically adjustably connected thereto as is the upper member 22 in Figures 1 to 3, while the middle member 18c and upper member 22c correspond respectively to the middle member 18 and lower member 14 of Figures 1 to 3, except that they are both to the rear of the post 9, to which they are vertically adjustably connected as in the other constructions.

It will be thus seen that there are illustrated in the drawings a number of possible variations of the invented construction, in all of which the horizontally disposed, parallel cross-members of the barrier are arranged in a rearwardly extending, upwardly inclined series, in each of which constructions the said members are vertically adjustable along the stall posts and with reference to each other, and it will be also apparent to those skilled in the art that by re-arrangement the parts forming any one of these constructions may be made to form some of the other constructions illustrated, as for instance the parts shown in Figure 3 when reversed and re-arranged, would form the construction illustrated in Figure 7. Thus the construction provides for both vertical and front-to-rear mutually relative adjustment of the several cross-members forming the barrier at the front end of the stall.

In using a stall of the character described the lower cross member of the barrier is the one to which the animal is usually tied, as by the halter rope 25 and the said lower member together with the middle member and upper member are so adjusted with relation to each other and with reference to the size of the animal to be accommodated that the height of the barrier is substantially that of the animal's head when in the normal standing position. When the animal desires to eat from the manger 6, it may step forward and comfortably lower its head under the lower member 14 for access to the manger therebelow, whereas when it lifts its head from the manger to the normal standing position the barrier cross members being in the way, the animal will naturally step back to avoid such obstruction, thus bringing it into position where the gutter 7 may serve its purpose and thus prevent soiling the floor of the stall, as will be readily apparent to those skilled in the art. Here it should be noted that the front to rear upward inclination of the series of cross bars is specially adapted to govern the movement of the animal without forcible restraint, undue hindrance or irksome annoyance, the forward position when feeding and the rear position at other times being assumed, after a short experience in the stall, in a natural and spontaneous manner without interference with the animal's comfort.

If it be desired to induce the animal to move to the forward part of the stall when about to lie down a cross bar 26 with its ends in the grooves 8 of the side curbs 4 may be arranged so that the same will not be comfortable for the animal to lie upon when too far back in the stall. This device, while well known in the art and forming in itself no important part of the present invention, is very desirable for use in connection with the other features of the stall herein described.

Some or all of the cross members forming the barrier of the stall in this invention being preferably of tubular construction and continuous for a series of stalls, one of said members may be used as a water supply line for water bowls or fountains such as are commonly in use in modern dairy barns, the extra line of pipe for the water supply thus being omitted at a considerable saving in the cost of installation, while at the same time being of greater simplicity. In similar manner one of the continuous cross members may be used as the vacuum line for milking machines and other uses of the continuous tubular front members will suggest themselves to those skilled in the art.

In building stalls of the character described, it will be noted that for the larger breeds of cattle the form of construction and adjustment illustrated in Figures 1 and 2 should be adopted. For younger cattle or smaller breeds the members 14 and 18 may be dropped to the lower adjustment illustrated in Figure 3 and for still younger or smaller cattle it may be desired to rearrange the parts as illustrated in Figure 6, or, in extreme cases to adopt the construction illustrated in Figure 7 which is intended for extremely short animals. In each of these constructions, it should be further noted, the cross members are capable of vertical adjustment on the posts 9 as may be necessary to take care of special cases and still further and more extensive adjustment than those illustrated may be attained by substituting arms of different lengths in place of the arms 16 and 20, illustrated in the drawings.

Attention should also be called to the desirability of providing the fillers 12 and the high side curbs 4 in order to segregate the animals in adjacent stalls so that they cannot disturb one another as would otherwise be natural in a stall permitting such freedom of movement.

Although the drawings and specifications thus presented disclose some of the best modes in which we have contemplated embodying our invention, we desire to be not limited to the details of such disclosure for the invention is broader than such details would indicate and many changes in form, construction and application may be made, as circumstances require or experience may suggest, without departing from the essential features of the invention, within the scope of the appended claims.

We claim:—

1. In a tie stall provided with a manger, a front end barrier formed of a plurality of horizontally disposed, vertically spaced cross members only, said members being adapted for both vertical and front to rear mutually relative adjustment.

2. In a tie stall provided with a manger, a front end formed of but three horizontal, relatively adjustable cross members spaced, arranged in an inclined series spaced above said manger.

3. In a tie stall provided with a manger adjacent the floor, a stall front barrier comprising a plurality of horizontally disposed, spaced cross members only arranged in an upwardly inclined, rearwardly extending series, the lower member of said series being upwardly spaced from the manger to permit access thereto by an animal in the stall, and said cross members being relatively adjustable, whereby said series may be located substantially at the height of the animal's head in its normal position when standing and whereby said animal may lower its head beneath said series to eat from said manger and will be induced to step backward to avoid said series of cross members when its head is raised to the normal position.

4. In a tie stall, in combination with spaced, fixed, vertical stall posts, a stall front barrier comprising horizontally disposed, vertically and horizontally spaced parallel cross members, vertically and horizontally individually adjustably connected to said stall posts.

5. In a tie stall, in combination with spaced, vertically disposed stall posts, a stall front barrier formed of a plurality of horizontally disposed, spaced cross members and supporting means connected to said cross members and to said stall posts, said means being adapted for fixed attachment to said posts in various vertical adjustments and also adapted for adjustment into forwardly extending or rearwardly extending positions with reference to said posts.

6. In a tie stall provided with stall posts at the front thereof, horizontally disposed, parallel cross members supported by said posts, forming the only barrier at the front end of said stall and arranged in a rearwardly extending, upwardly inclined series, said members being vertically adjustable along said posts and with reference to each other, whereby the said members may be arranged in any of several different formations, for the purpose specified.

In testimony that we claim the above, we have hereunto subscribed our names.

EDWIN G. HIBBS.
D. D. MILLER.